(12) United States Patent
Zorzo

(10) Patent No.: US 7,083,064 B2
(45) Date of Patent: Aug. 1, 2006

(54) DEVICES FOR THE RELEASE OF THE DIVIDING WALL FROM COUPLING WITH RESERVOIRS OR BUCKETS

(75) Inventor: Bruno Zorzo, Villa del Conte (IT)

(73) Assignee: Filmop S.R.L., Villa del Conte PD (IT)

( * ) Notice: Subject to any disclaimer, the term of this patent is extended or adjusted under 35 U.S.C. 154(b) by 433 days.

(21) Appl. No.: 10/616,013

(22) Filed: Jul. 9, 2003

(65) Prior Publication Data

US 2004/0007577 A1    Jan. 15, 2004

(30) Foreign Application Priority Data

Jul. 12, 2002   (IT)   .......................... PD2002A0189

(51) Int. Cl.
*B65D 1/24*   (2006.01)
*B65D 1/36*   (2006.01)
*B65D 25/04*  (2006.01)
*B65D 57/00*  (2006.01)
*B65D 85/00*  (2006.01)

(52) U.S. Cl. ...................................... 220/529; 220/532
(58) Field of Classification Search ................ 220/527, 220/529, 532, 533, 544, 502; 43/56
See application file for complete search history.

(56) References Cited

U.S. PATENT DOCUMENTS

| | | | | | |
|---|---|---|---|---|---|
| 1,454,537 | A | * | 5/1923 | Chalfant et al. | ............. 220/532 |
| 1,913,409 | A | * | 6/1933 | Purtell | ......................... 220/285 |
| 2,220,135 | A | * | 11/1940 | Wardell | ..................... 29/522.1 |
| 4,301,942 | A | * | 11/1981 | Kupperman et al. | ... 220/592.17 |
| 5,082,139 | A | * | 1/1992 | Quam | ......................... 220/530 |
| 5,615,797 | A | * | 4/1997 | Ripamonti | ................... 220/529 |
| 2002/0096525 | A1 | * | 7/2002 | Bertoldo et al. | ............. 220/544 |

* cited by examiner

*Primary Examiner*—Stephen K. Cronin
*Assistant Examiner*—Harry Grosso
(74) *Attorney, Agent, or Firm*—Thomas S. Baker, Jr.

(57) ABSTRACT

A bucket having a detachable dividing wall slidable or movable in side and bottom wall grooves with cam levers located on the wall at the bucket rim for detaching the dividing wall from the bucket.

3 Claims, 7 Drawing Sheets

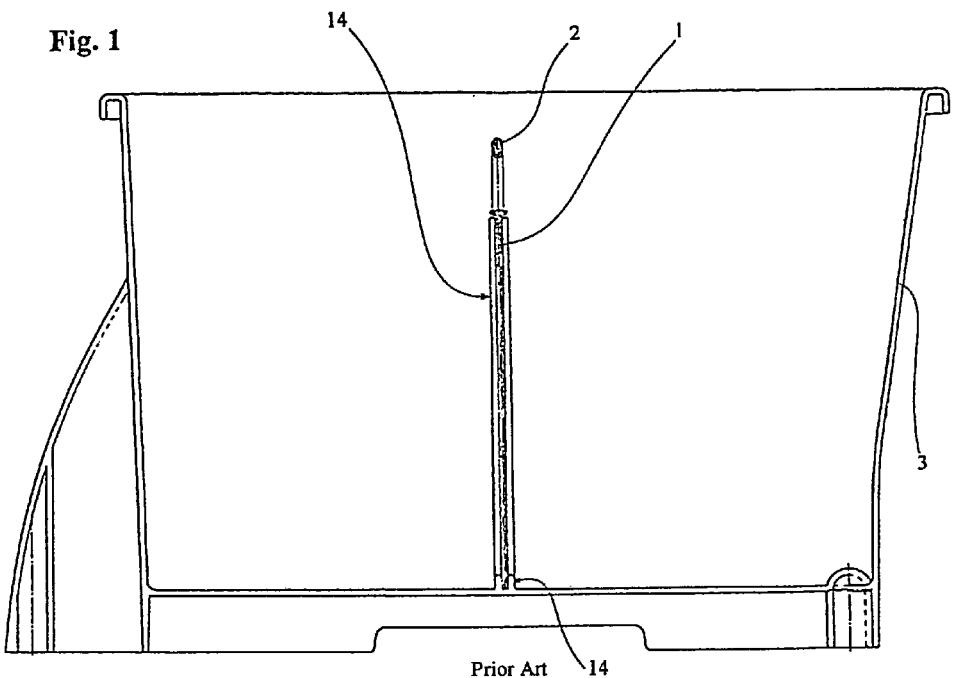
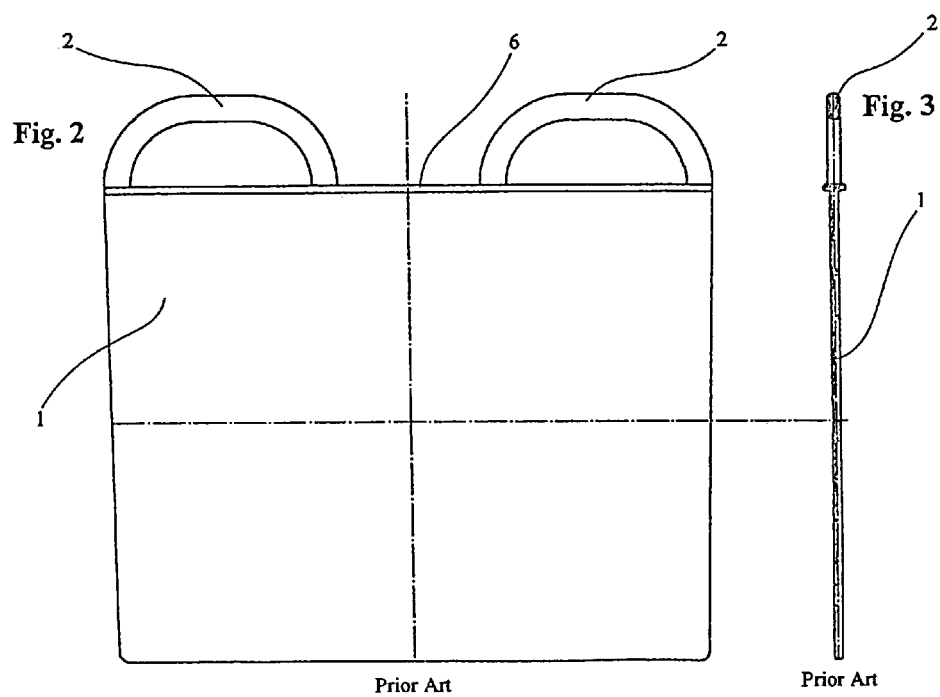

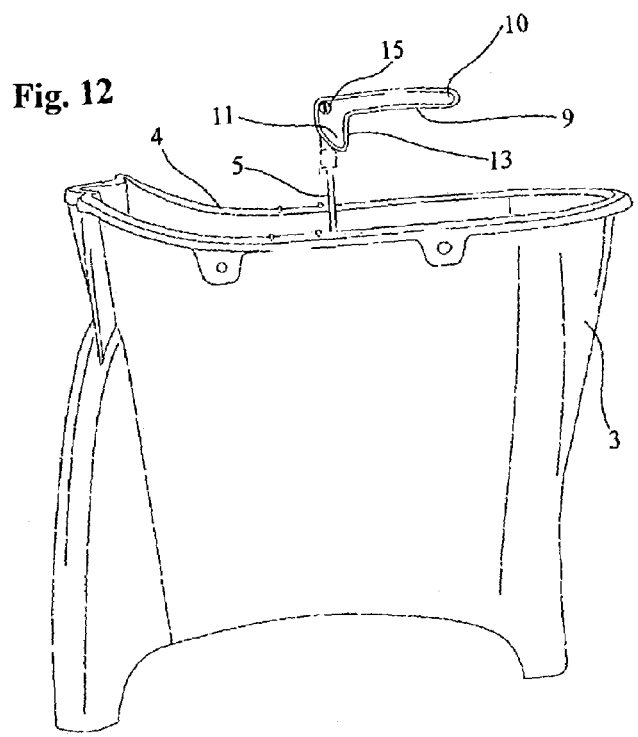
Fig. 12
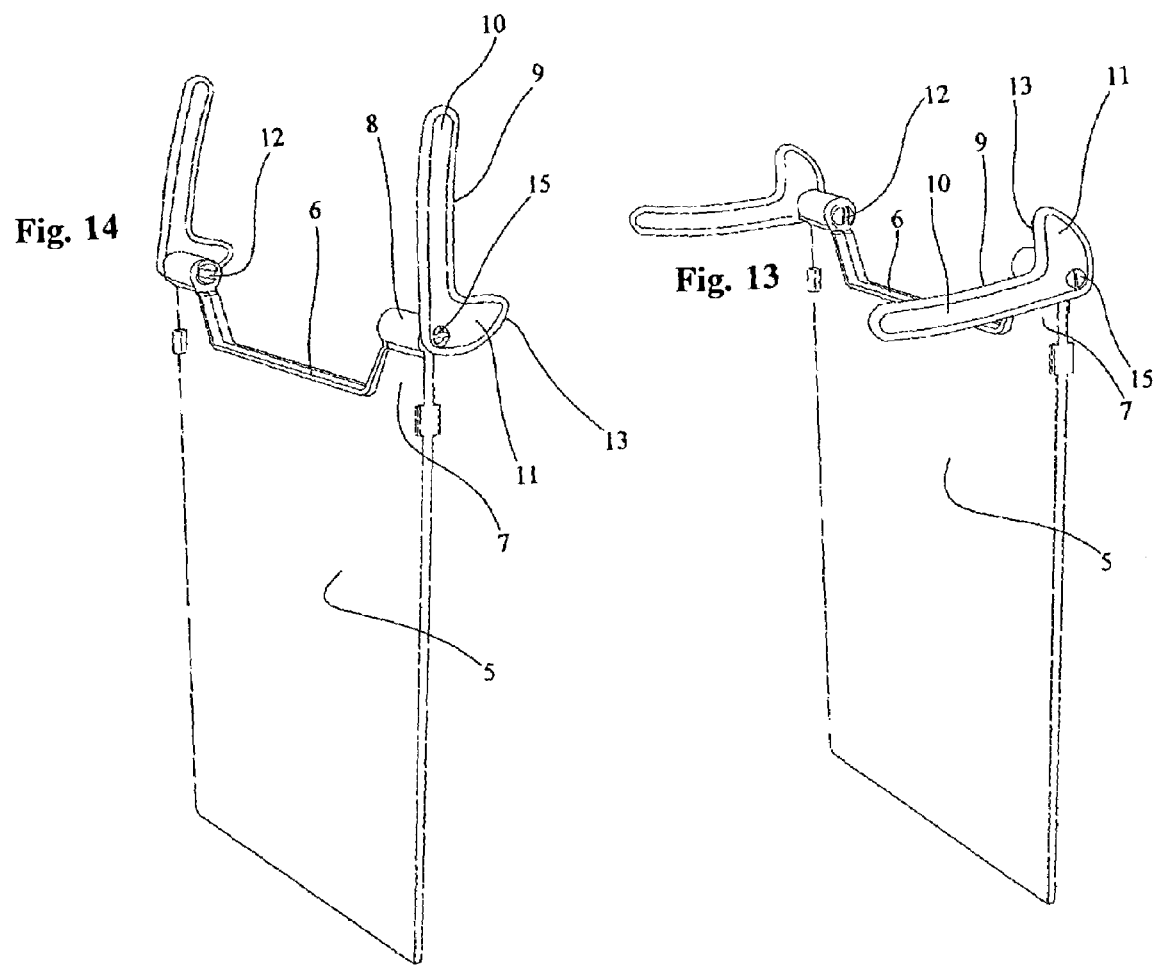
Fig. 14
Fig. 13

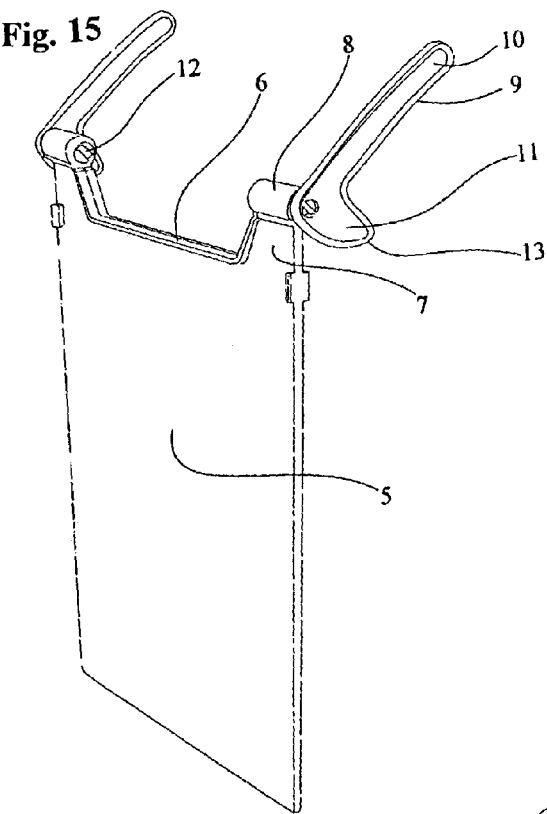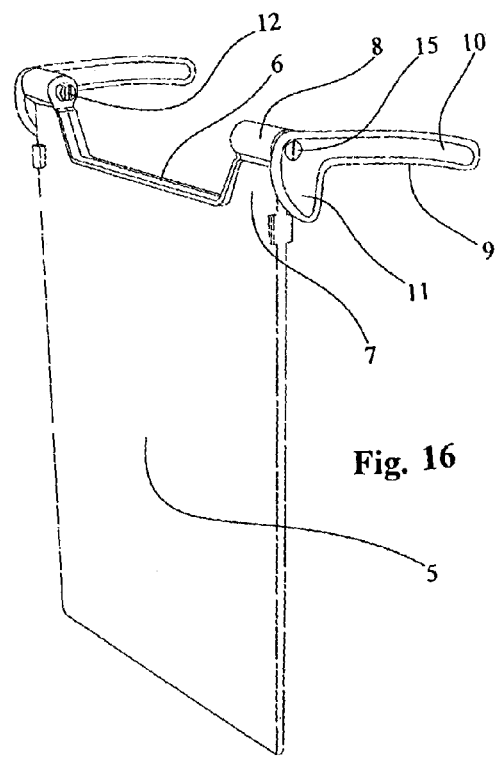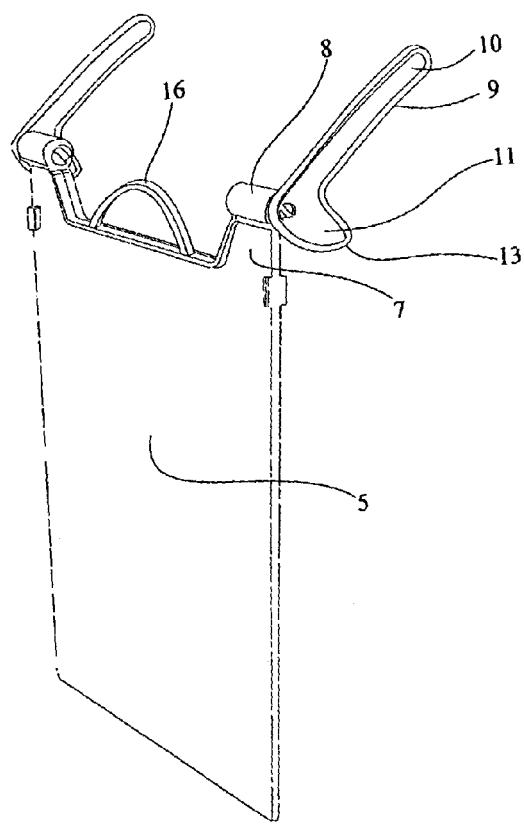

DEVICES FOR THE RELEASE OF THE DIVIDING WALL FROM COUPLING WITH RESERVOIRS OR BUCKETS

CROSS-REFERENCES

None.

BACKGROUND OF THE INVENTION

The use of buckets which can be divided in compartments by means of movable dividing walls inserted with seal couplings in the suitable grooved seats placed in continuity in the walls and on the bottom.

In order to guarantee the tightness among the compartments the coupling between the perimeter's measuring of the dividing wall and the grooved seat carried out in low relief (or in relief by means of two edges brought nearer and lifted up) in continuity in the walls and on the bottom.

In order to guarantee the tightness among the compartments the coupling between the perimeter's measuring of the dividing wall and the grooved seat carried out in low relief (or in relief by means of two edges brought nearer and lifted up) in continuity in the walls and on the bottom, the coupling is considerably carried out in a forced manner.

For those people making the insertion, this is however not difficult to carry out because they are in a comfortable position to push the wall downward with the bucket laid down on the floor.

As regards the release the case is different.

At this moment, on the higher free edge of the dividing wall some handles shaped with little windows are made for the hold of those ones who have to carry out the extraction of the above mentioned wall. The release presents considerable difficulties and sometimes it is necessary to intervene by means of some tools.

The traction upward of the dividing wall, with the hold of the handles with little windows, has to be almost always carried out by the two hands together; on the other side, if the parallelism of the pull is not carried out, this causes the groove clogginess of the above mentioned wall. However, almost always, the wall drawn upward would not release if a person did not intervene to hold the bucket, because trying to lift up the dividing wall, you lift up the bucket too.

Considering the difficulty to take the wall off the bucket, the user sometimes prefers t(i leave it inserted, even if he or she knows that the bucket will be more difficult to wash. If the fact of not to succeed in taking the dividing wall off from the bucket happens very frequently, then, the fact of having a bucket with a dividing wall is no longer useful and to buy it at a higher cost becomes unjustified.

The aim of the present patent is to equip the bucket with a movable dividing wall of a device to execute the release of the wall in an easy way, without difficulties, without requiring the help of any tool or the help of a second person.

The air is to carry out, at the sides of the higher free edge of the dividing wall, two lifting expansions with one portion surmounting the bucket's edges leaving suitable spaces in correspondence to the bucket's edges.

By inserting two lever elements into the above mentioned spaces, the enlarging forcing of the aforesaid spaces is carried out; this causes the initial detachment of the coupling of the wall as regards its seat.

The enlarging entity of the initial spaces, when the dividing wall is inserted, can correspond to the depth of the groove of the bottom where the lower edge of the wall is coupled.

The initial detachment can be favored if, as it usually happens, the bucket's side walls, having the grooves for the insertion of the dividing wall, are in some way inclined of how is required to make the extraction of the mold easier at the end of the molding.

The devices for the release of the dividing wall from the coupling with reservoirs or buckets where it is inserted, in this specific case considered in the present patent, are carried out as it is explained below.

The dividing wall is carried out with two lifting expansions placed at the sides of the free higher edge which end at the top with two tubular seats whose axles and the same layer are horizontally positioned.

Two knee levers, which, in correspondence to the fulcrum, are provided with an (overhang) pin, are assembled with the aforesaid pin into the two tubular seats of the above mentioned dividing wall in such a way that they are fixed to it.

When the aforesaid dividing wall is coupling inserted into the bucket to carry out the division into compartments, the knee levers are found above the edges of the bucket's sides in a position of inactivity.

In order to release the dividing wall from the bucket, you have to make the arms of the levers force turn upward and consequently the arms of the resistance turn downward by inserting between the fulcra and-the edges of the bucket's sides the growing eccentric profile of the knee shape.

By this operation, the release is carried out without considerable effort. Another solution, which is different from the point of view of manufacture, can be carried out by making the lifting expansions of the dividing wall end on their top, instead of with tubular seats, with overhang pins having an outward horizontal position and with the same layer of the dividing wall. The knee levers, instead of being equipped of an overhang pin in correspondence to the fulcrum, are provided with a hole which is the seat to be coupled with the pins.

The eccentricity of the profile of the arm of the knee lever's resistance and the length of the arm of the lever's force are adequately chosen in order to make the release operation of the wall inserted into the bucket easier. With the carrying out of the present, you reset the normal use of buckets equipped with movable dividing walls, which, at the present moment, show considerable difficulties related to the release of the aforesaid dividing walls. Here it is useful to clarify that nothing changes if the kind of coupling of the dividing wall along the walls and the bottom of the bucket is carried out with a grooved seat made in the bucket and the male perimeter measuring of the wall or if the kind of coupling of the dividing wall along the walls and on the bottom of the bucket is carried out by making a relief it;s the bucket (having a male function) and the perimeter measuring of the dividing wall provided of a correspondent groove (having a female function).

What hits been previously described is clearly explained by the analysis of the drawings here enclosed considering a preferable solution which does not put any limits.

It is the case in which the device of the present patent is carried out only on one side of the higher edge of the dividing wall since the aim of the release from the bucket, where the aforesaid wall is inserted, is obtained all the same in a sufficiently valid manner.

BRIEF DESCRIPTION OF THE DRAWINGS

FIG. 1 shows a bucket of the type present in the market with the movable dividing wall inserted.

FIG. 2 shows out of work a dividing wall of the type present in the market which is provided on its higher edge of little hold handles with windows.

FIG. 3 shows the dividing wall as shown in FIG. 2 seen from its profile.

FIGS. 8, 9, 10, 11, 12 show, seen from its side and partially from the top, a bucket with the dividing wall inserted where the device for the relief of the wall (the knee lever placed in its fulcrum on the lifting expansions of the dividing wall) assumes in sequence the several different positions represented in FIGS. 4, 5, 6, 7.

FIGS. 13, 14, 15, 16, show, out of work, a dividing wall with the knee levers whose pin fulcra are inserted in the tubular seats placed at the top of the lifting expansions at the sides of the free higher edge of the aforesaid dividing wall.

FIG. 17 shows, out of work, a dividing wall correspondent to FIGS. 13, 14, 15 and 16 but with the application, in the central area of the higher edge, of a little handle with a window.

DETAILED DESCRIPTION

Figure 4:
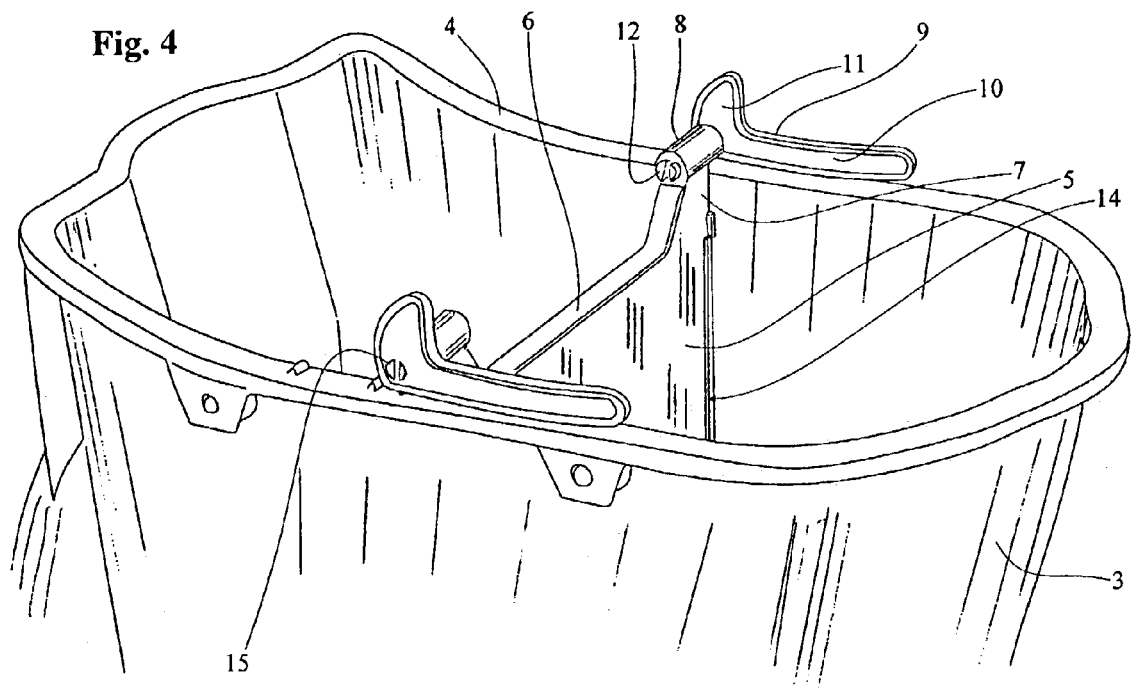
FIG. 4 shows in an axonometric way the higher part of a bucket with the movable dividing wall inserted and complete of its relief device according to the present patent.
Figure 5:
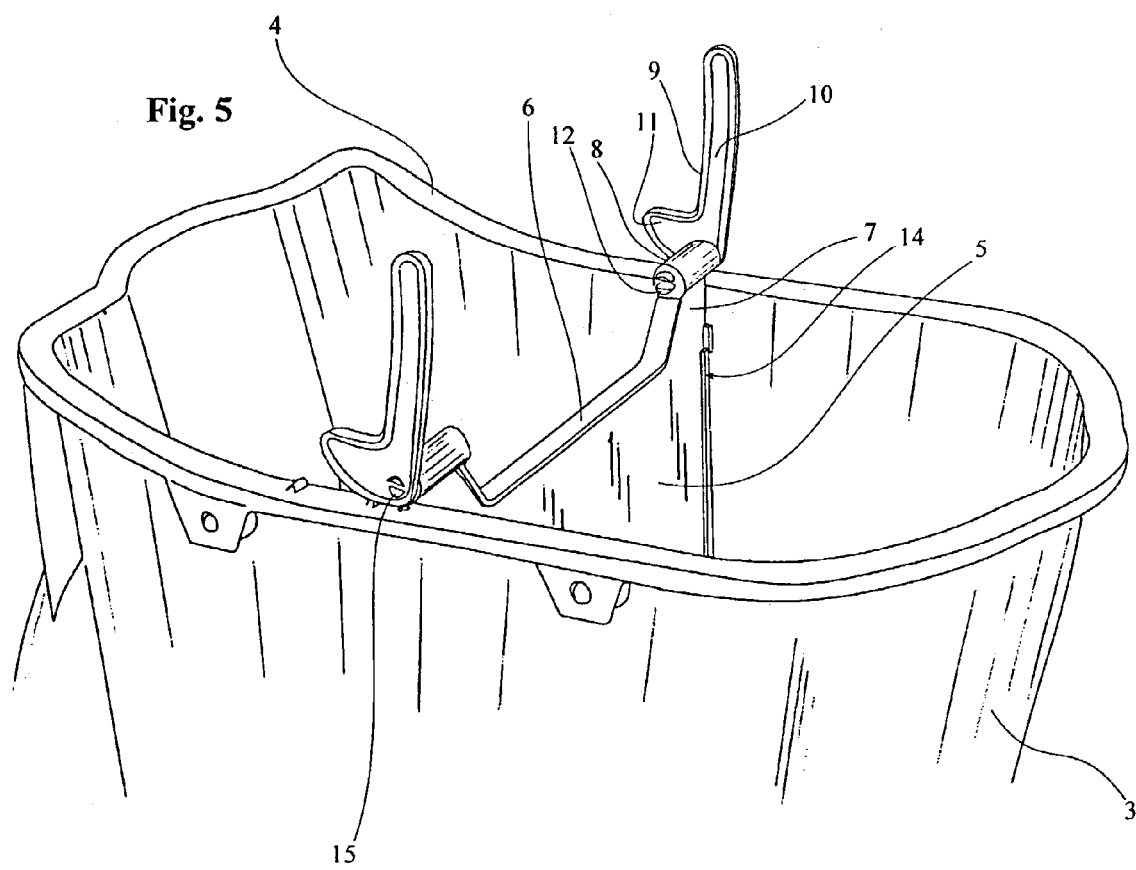
FIG. 5 is the representation correspondent to FIG. 4 where the knee levers, because of the relief of the dividing wall, are turned of 90. Upwards with the resistance-lever arms equipped of the-eccentric cuneiform profile in the initial position to be activated.
Figure 6:
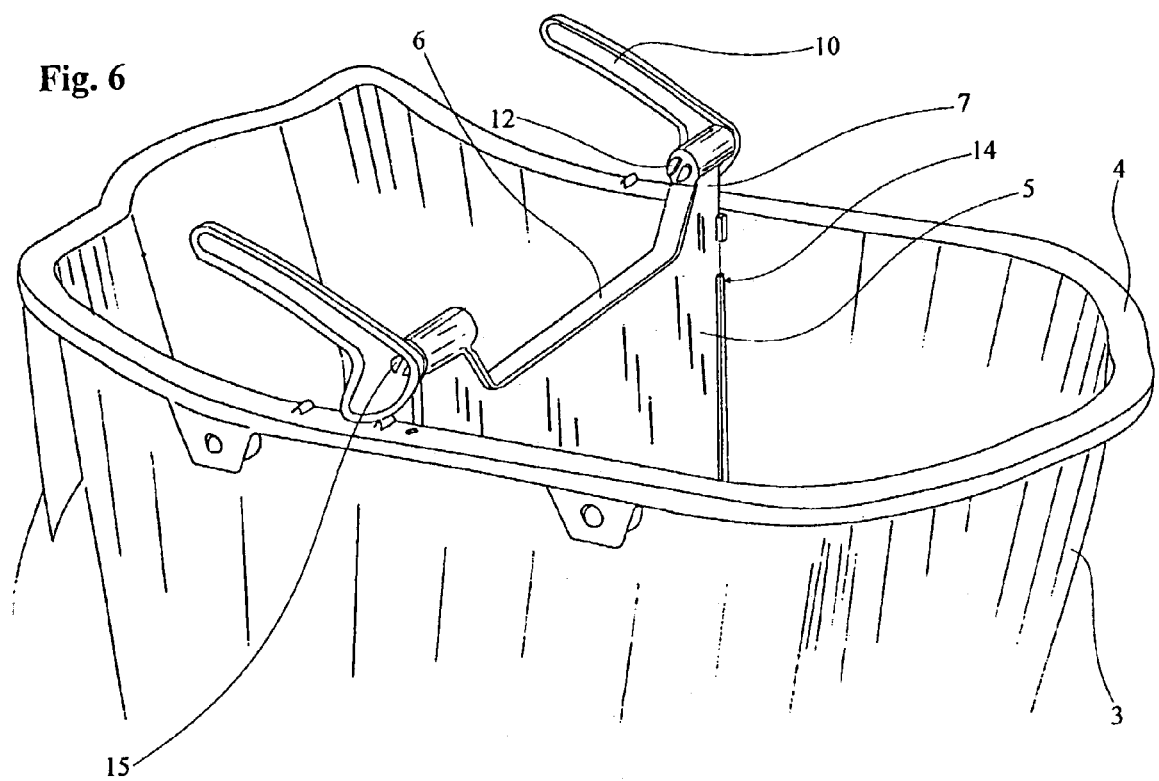
FIG. 6 is the representation correspondent to FIG. 5 where the knee levers are turned further and the lever arms with the eccentric profile have accomplished their action of lifting up the first detachment of the dividing wall.
Figure 7:
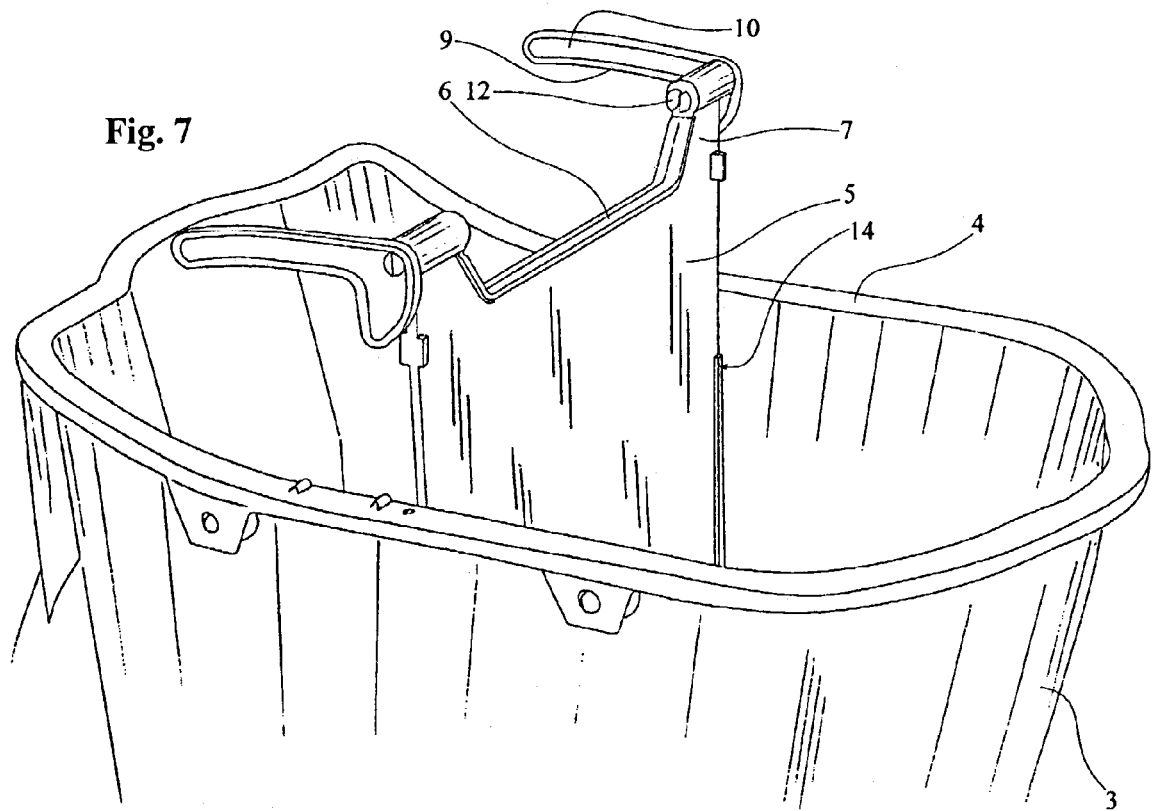
FIG. 7 is the representation correspondent to FIG. 6 where the dividing wall carried out according to the present patent is partially extracted from the bucket.
Figure 8:
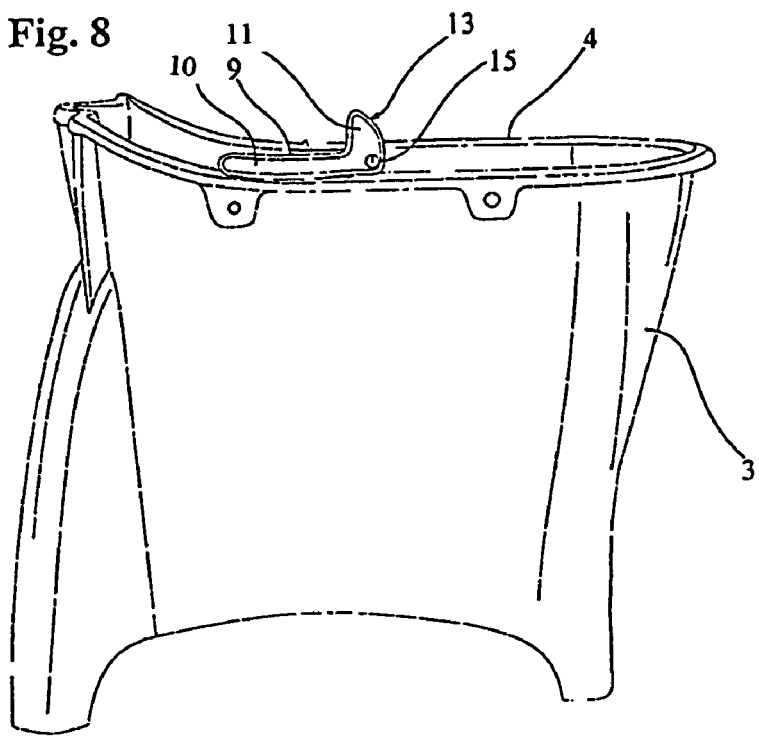
Figure 9:
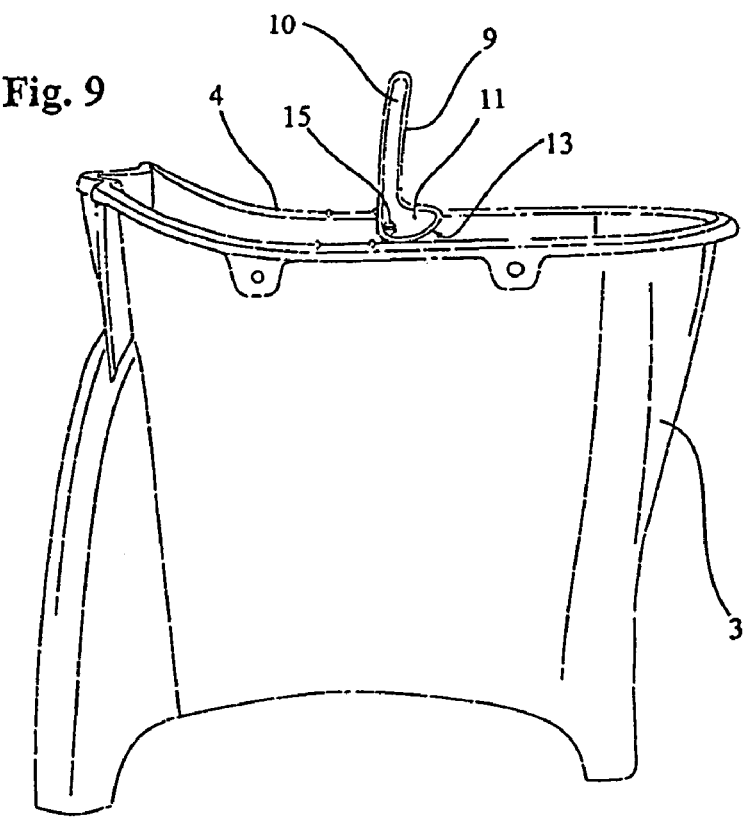
Figure 10:
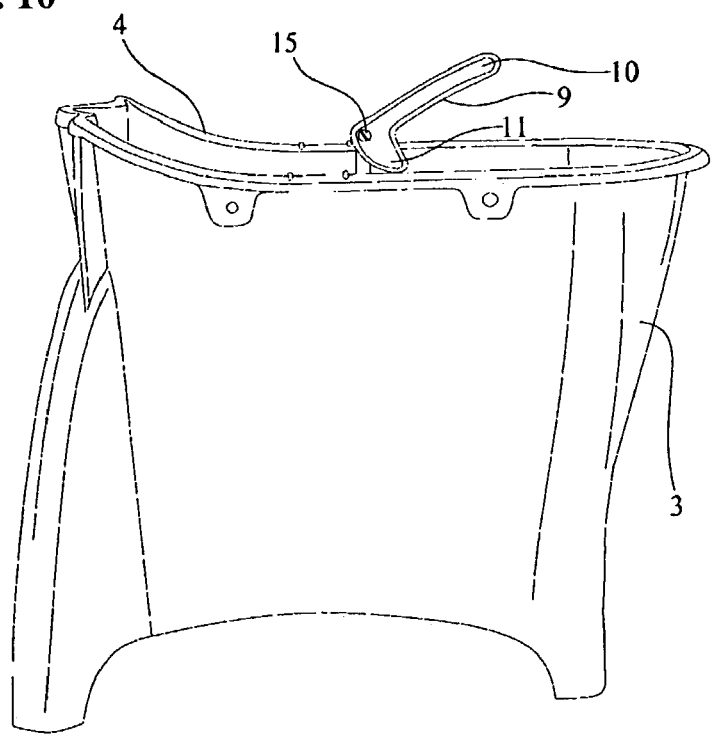
Figure 11:
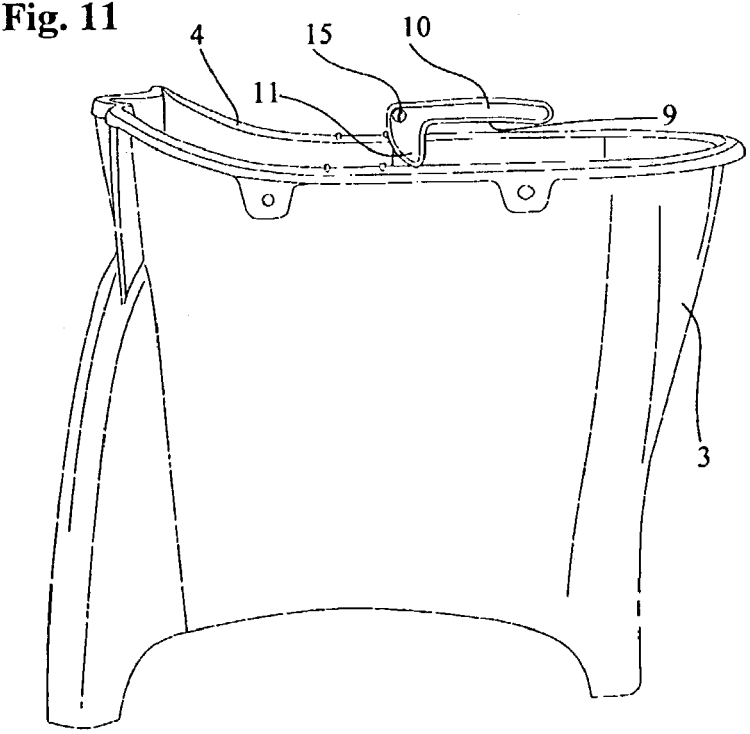

With reference to the pictures, it has been noticed that the bucket 3, provided inside, along the sides and on the bottom of a seat 14 grooved for the insertion of the divining wall 2, 5, presents inside a dividing wall 1.

The aforesaid dividing wall 1, of the type already existing on the market, possesses some window handles applied on the free higher edge 6.

The dividing wall 5 carried out according to the patent presents at the sides of the edge, 6 the lifting expansions 7 ending at the top with tubular cylindrical seats 8.

Inside the aforesaid cylindrical tubular seats 8 the elbow levers 9 are hinged by means of she pin 12 which, in an orthogonal way, with an overhang, detaches in correspondence to the fulcrum 15.

The aforesaid elbow levers are structured with a force arm 10 and at 90(degrees) by the aforesaid arm 10 by a further resistance arm 11. The resistance arm possesses an eccentric profile 13 in relation to the fulcrum 15.

For the lifting up of the dividing wall 15 inserted into the bucket 3 you have to make the force arm 10 of the lever 9 turn upwards and consequently the resistance arm 11 turns downwards. Going on with the rotation of the lever 9 the resistance arm 11, laying down itself on the edge 4 of the bucket 3, underpins with its profile into the space between the aforesaid higher edge 4 of the bucket 3 and the fulcrum 15 of the lever 9; in this way determining its lifting up.

The overhang pin 12, coaxial with the fulcrum 15, in agreement with the lever 9, is lifted up too and being inserted into the tubular seat 8, in agreement with the dividing wall 5, lifts the aforesaid dividing wall 5 up too, causing its uncoupling with the bucket 3.

The window handle 16 is used to make the hold of the dividing wall 5 easier when it is out of work or when it has to be inserted into the bucket 3 or when you want to complete the lifting up after the initial release from the bucket 3 carried out by means of the elbow levers 9.

Any expert even of this specific field must not go outside this patent even when he or she can carry out any ameliorative solution by using the instructions of the present invention.

The invention claimed is:

1. A bucket having a side wall partially defined by a top edge and a bottom which comprises
    a groove formed in opposite sides of the side wall and in the bottom;
    a removable divider wall having an upper portion and partially defined by bottom and opposite side edges adapted to be inserted in the side wall grooves and the bottom groove;
    a pair of rotatable knee levers affixed to the upper portion of said divider wall adjacent said top edge of the bucket;
    a cam profile formed on each of said knee levers;
    said knee levers moveable between a first position in which said cam profile is substantially disengaged from said bucket top edge and said dividing wall is inserted in said side wall grooves and said bottom groove and a second position in which said cam profile is substantially engaged with said bucket top edge to raise said dividing wall such that said dividing wall is inserted in said side wall grooves and spaced from said bottom groove.

2. The bucket of claim 1 wherein said knee levers are pivotally attached to said top edge of said bucket.

3. The bucket of claim 2 wherein each of said pivotal attachments comprises a pin and a cylindrical receptacle.

* * * * *